United States Patent
Nagata et al.

(10) Patent No.: US 12,498,713 B2
(45) Date of Patent: Dec. 16, 2025

(54) REMOTE CONTROL SUPPORT OF AUTONOMOUS VEHICLE PREDICTIVE DRIVING PLAN PRIORITIES

(71) Applicant: TOYOTA JIDOSHA KABUSHIKI KAISHA, Toyota (JP)

(72) Inventors: Yu Nagata, Chofu (JP); Ibuki Shimada, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 18/381,705

(22) Filed: Oct. 19, 2023

(65) Prior Publication Data

US 2024/0184285 A1 Jun. 6, 2024

(30) Foreign Application Priority Data

Oct. 21, 2022 (JP) .............................. 2022-169485

(51) Int. Cl.
*B60W 60/00* (2020.01)
*G05D 1/00* (2024.01)
*G07C 5/00* (2006.01)

(52) U.S. Cl.
CPC ....... *G05D 1/0011* (2013.01); *B60W 60/0015* (2020.02); *G07C 5/008* (2013.01); *B60W 2556/45* (2020.02)

(58) Field of Classification Search
CPC ............ G05D 1/0011; B60W 60/0015; B60W 2556/45; G07C 5/008
See application file for complete search history.

(56) References Cited

U.S. PATENT DOCUMENTS

| 2019/0163176 | A1* | 5/2019 | Wang ................... G05D 1/0088 |
| 2021/0041894 | A1 | 2/2021 | Urano et al. |
| 2024/0184303 | A1 | 6/2024 | Nagura et al. |
| 2024/0338030 | A1* | 10/2024 | Kusakabe ................ G08G 1/00 |
| 2025/0060751 | A1* | 2/2025 | Tonoike ................. G05D 1/227 |
| 2025/0126229 | A1* | 4/2025 | Mori ........................ G08G 1/09 |

FOREIGN PATENT DOCUMENTS

| JP | 2021-026696 A | 2/2021 |
| JP | 2022-019169 A | 1/2022 |
| JP | 2023-011353 A | 1/2023 |

* cited by examiner

*Primary Examiner* — Scott A Browne
*Assistant Examiner* — Terry C Buse
(74) *Attorney, Agent, or Firm* — Dinsmore & Shohl LLP (57) ABSTRACT

A remote control support apparatus according to the present disclosure is a remote control support apparatus for autonomous vehicles and includes a controller configured to acquire a plurality of driving plans, each driving plan being for a different autonomous vehicle, acquire history information on past remote support requests from autonomous vehicles, predict an occurrence of a remote support request in each driving plan in the plurality of driving plans based on the history information, and in a case in which the occurrence of a predetermined remote support request is predicted in two or more driving plans within an identical time frame, change at least one of the two or more driving plans.

4 Claims, 5 Drawing Sheets

REMOTE CONTROL SUPPORT OF AUTONOMOUS VEHICLE PREDICTIVE DRIVING PLAN PRIORITIES

CROSS-REFERENCE TO RELATED APPLICATION

This application claims priority to Japanese Patent Application No. 2022-169485, filed on Oct. 21, 2022, the entire contents of which are incorporated herein by reference.

TECHNICAL FIELD

The present disclosure relates to a remote control support apparatus.

BACKGROUND

Technology for remotely supporting control of autonomous vehicles is known. For example, Patent Literature (PTL) 1 discloses a vehicle remote instruction system that allocates monitoring times for a plurality of autonomous vehicles to one remote commander and changes the driving plan for at least one vehicle in a case in which the number of overlapping monitoring times exceeds the number of remote commanders.

CITATION LIST

Patent Literature

PTL 1: JP 2021-026696 A

SUMMARY

Demand exists for further improvement in the usefulness of technology for remotely supporting control of autonomous vehicles. For example, in the case of changing the driving plan of an autonomous vehicle in conjunction with remote control support, there is a need to change the driving plan taking priority into consideration, such as the driving plan of the autonomous vehicle that would lead to efficient remote control support if changed on a priority basis.

It would be helpful to improve the usefulness of technology for remotely supporting the control of autonomous vehicles.

A remote control support apparatus according to an embodiment of the present disclosure is a remote control support apparatus for autonomous vehicles and includes a controller configured to:

acquire a plurality of driving plans, each driving plan being for a different autonomous vehicle;

acquire history information on past remote support requests from autonomous vehicles;

predict an occurrence of a remote support request in each driving plan in the plurality of driving plans based on the history information; and in a case in which the occurrence of a predetermined remote support request is predicted in two or more driving plans within an identical time frame, change at least one of the two or more driving plans.

According to an embodiment of the present disclosure, the usefulness of technology for remotely supporting the control of autonomous vehicles is improved.

DETAILED DESCRIPTION

Hereinafter, an embodiment of the present disclosure will be described.

Outline of Embodiment

Figure 1:
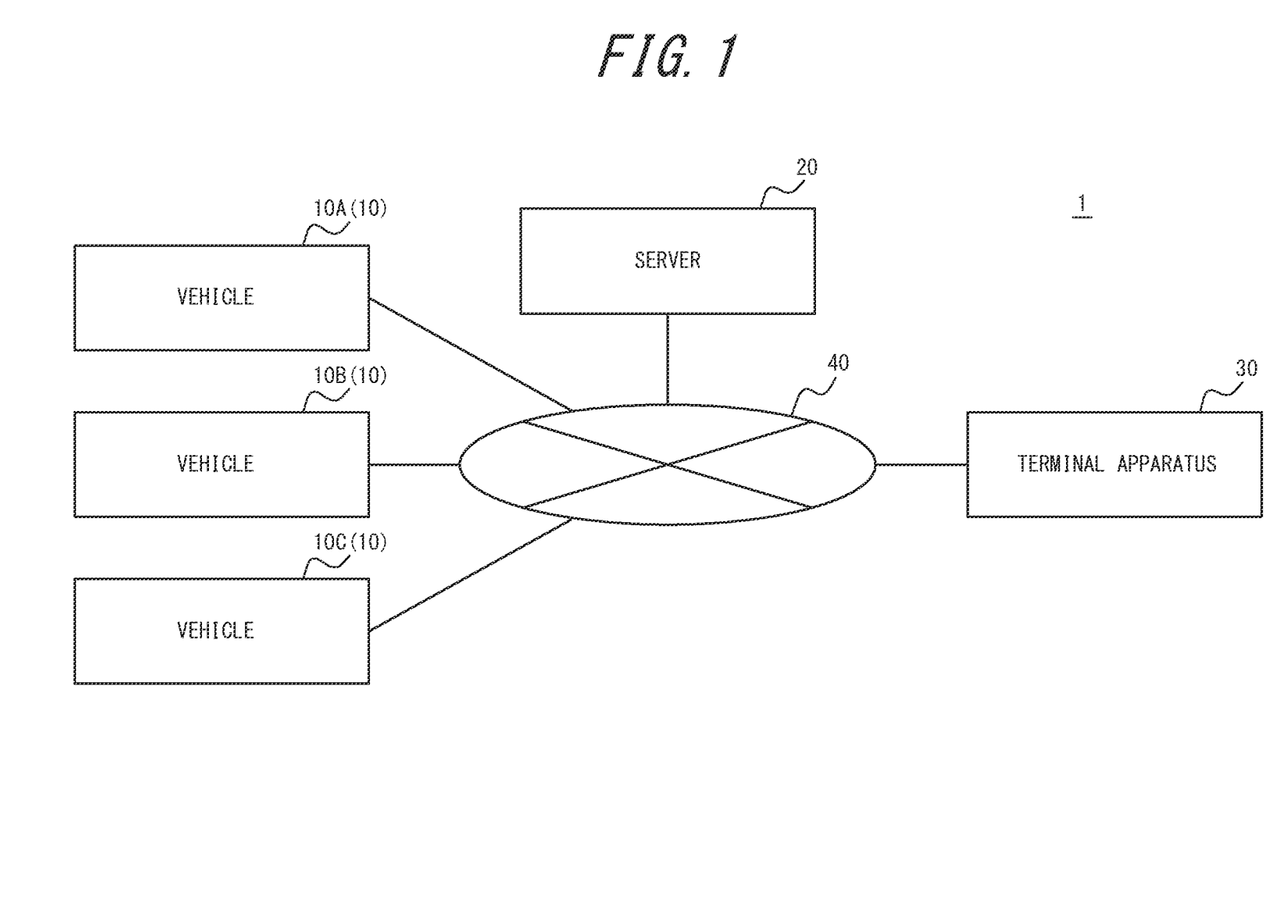
FIG. 1 is a block diagram illustrating a schematic configuration of a remote control support system according to an embodiment of the present disclosure.

With reference to FIG. 1, a remote control support system 1 according to an embodiment of the present disclosure will be described. FIG. 1 is a block diagram illustrating a schematic configuration of the remote control support system 1. The remote control support system 1 includes three vehicles 10 (vehicles 10A, 10B, 10C), a server 20, and a terminal apparatus 30. Hereinafter, the vehicles 10A, 10B, 10C are collectively referred to simply as the ∥ vehicle 10 ▯ when no distinction therebetween is made.

The vehicle 10 is an autonomous vehicle that can be driven at least partially by autonomous operation. The vehicle 10 may include an Autonomous Driving System (ADS), an Advanced Driver Assistance System (ADAS), or a control apparatus such as an Electronic Control Unit (ECU). The level of autonomous driving of the vehicle 10 may, for example, correspond to Level 3 or Level 4 according to the level classification defined by the Society of Automotive Engineers (SAE). However, the level of autonomous driving of the vehicle 10 is not limited to these levels.

In the present embodiment, the vehicle 10 is configured to drive autonomously according to a driving plan, while receiving remote control support from a remote operator as needed. The vehicle 10 may, for example, be a bus that travels, without a driver or a conductor, by circulating around the boarding or alighting positions of passengers along a travel route described in the driving plan. However, the vehicle 10 is not limited to buses and may be any vehicle, such as a passenger car, a motorcycle, or a truck.

The server 20 is configured by one or more computers. In the present embodiment, the server 20 may be configured by one computer or by a plurality of computers that can communicate with each other, such as a cloud computing system. In the following description, the server 20 is also referred to as a remote control support apparatus.

The terminal apparatus 30 is, for example, a personal computer, but is not limited thereto and may be any computer, such as a smartphone or a tablet. In the present embodiment, the terminal apparatus 30 is assumed to be used by an operator to provide remote control support for the vehicle 10.

For the sake of simplicity, FIG. 1 illustrates three vehicles 10 and one each of the server 20 and the terminal apparatus 30. However, the remote control support system 1 may include any number of vehicles 10, servers 20, and terminal apparatuses 30. The vehicles 10, the server 20, and the terminal apparatus 30 are communicably connected to a network 40 including, for example, the Internet, a mobile communication network, or the like.

Figure 2:
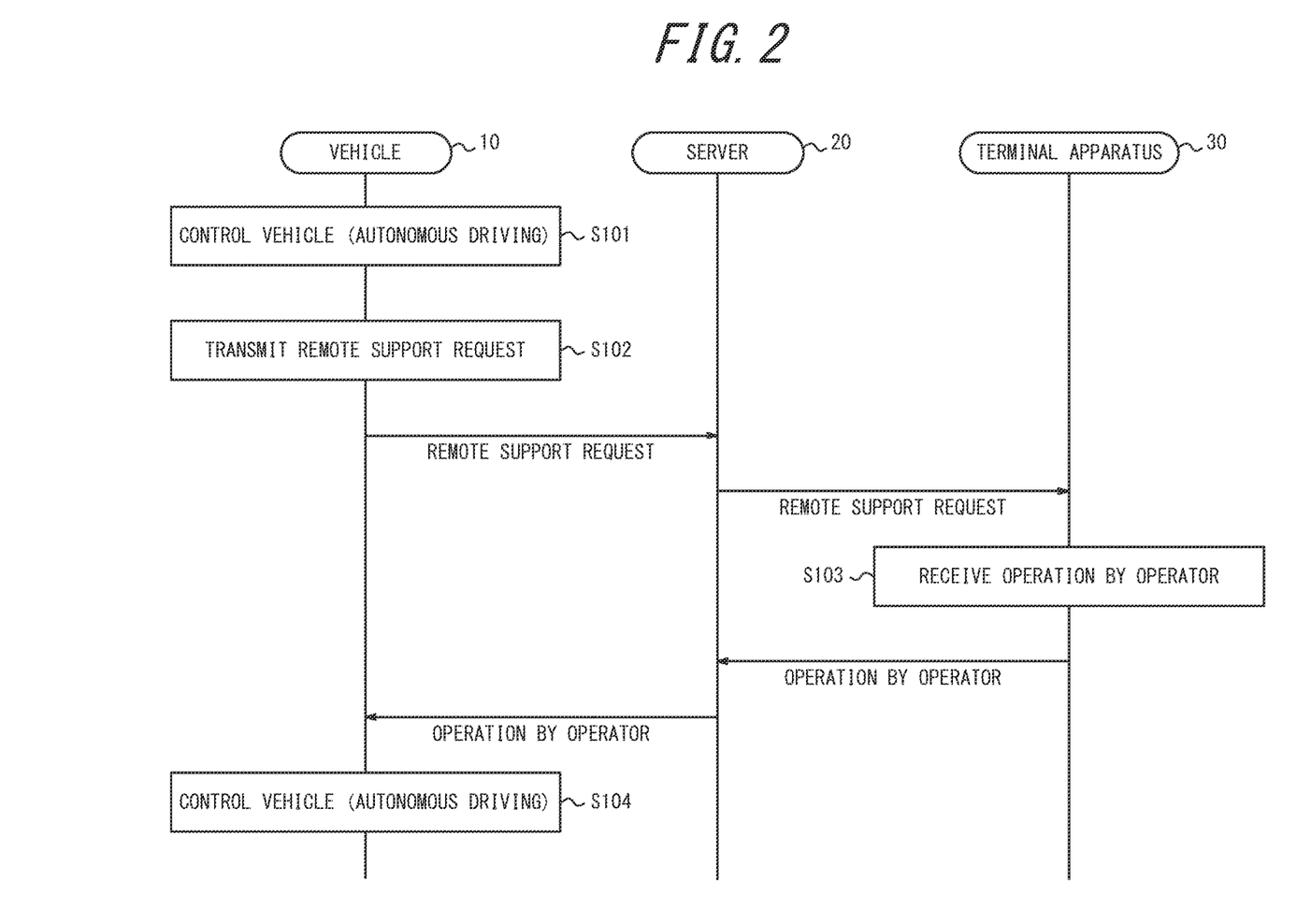
FIG. 2 is a flowchart illustrating first operations of the remote control support system.

First, with reference to FIG. 2, an overview of a remote control support system 1 serving as a premise for the present disclosure will be described. FIG. 2 is a flowchart illustrating first operations of the remote control support system 1. The remote control support system 1 is, for example, used for an operator to remotely support a portion of control of the vehicle 10, which is an autonomous vehicle. In other words, the remote control support system 1 is used for remote control support of the vehicle 10. The control of the vehicle can, for example, include control related to driving of the vehicle 10, such as acceleration, deceleration, or steering of the vehicle 10. The control of the vehicle 10 can also include control related to matters other than driving of the vehicle 10, such as opening and closing doors, checking occupant seating, or making onboard announcements.

Specifically, in the remote control support system 1, as illustrated in FIG. 2, the vehicle 10 is controlled according to a driving plan for the vehicle 10, and the vehicle 10 is driven autonomously (step S101). The vehicle 10 transmits a remote support request to the server 20 in a case in which remote support by an operator becomes necessary (step S102). A remote support request is, for example, a request for approval of a right (or left) turn by the vehicle 10 across oncoming traffic. The conditions, timing, and the like for transmitting a remote support request may be determined by the control apparatus of the vehicle 10 according to the driving plan for the vehicle 10. The remote support request from the vehicle 10 is transmitted via the server 20 to the terminal apparatus 30 of the operator responsible for remote support for that vehicle 10. The terminal apparatus 30 then displays the received remote support request, and upon receiving an operation by the operator, transmits the received operation by the operator to the server 20 (step S103). For example, upon receiving a request for approval of a right turn from the vehicle 10, the operator may check the video from an exterior camera installed on the vehicle and perform an operation to approve the right turn by the vehicle 10. The operation by the operator is transmitted via the server 20 to the vehicle 10 that transmitted the remote support request. The vehicle 10 executes control of the vehicle 10 based on the received operation by the operator and continues driving autonomously (step S104). In the remote control support system 1, these processes are repeated so that the vehicle 10 can drive autonomously with remote support by an operator.

Remote support for control of the vehicle 10 includes remotely operating the functions of the vehicle 10, transmitting control commands to the vehicle 10, transmitting information used to control the vehicle 10, authorizing the execution of control by the vehicle 10, and the like. In the present embodiment, remote support for control of the vehicle 10 is assumed to be performed manually by the operator of the remote control support system 1 via the terminal apparatus 30, for example. However, some of the remote support for control of the vehicle 10 may be carried out automatically by the server 20, which is a remote control support apparatus.

While details are provided below, the server 20, which is a remote control support apparatus, manages driving plans for a plurality of vehicles 10 to improve the usefulness of the above-described remote control support system 1. Specifically, the server 20 acquires a plurality of driving plans, each of which is for a different vehicle 10. The server 20 acquires history information on past remote support requests from the vehicles 10 and predicts the occurrence of remote support requests in each of the driving plans based on the history information. In a case in which the occurrence of a predetermined remote support request is predicted in two or more driving plans within an identical (same) time frame, the server 20 changes at least one of the two or more driving plans. The predetermined remote support request is, for example, a remote support request that requests operation by an operator, though this example is not limiting.

According to the present embodiment, in a case in which remote support requests from a plurality of vehicles 10 may occur in overlap based on the history information on past remote support requests, the driving plans of the plurality of vehicles 10 can thus be changed so that the timings of the occurrence of the remote support requests do not overlap. This enables the occurrence of remote support requests to be distributed, preventing a delay in response by the operator to the remote support requests from the vehicles 10.

In the present embodiment, the [ driving plan] for the vehicle 10 is the driving schedule for the vehicle 10. The driving plan for the vehicle 10 includes, for example, information such as the departure location, transit point, destination, travel route that the vehicle 10 will travel, traffic rules, travel time slot, estimated time of departure from the departure location, estimated time of arrival at the transit point, and estimated time of arrival at the destination. However, the driving plan for the vehicle 10 may include information other than the above-described information.

In the present embodiment, the ] remote support requests || can be classified into a plurality of categories depending on the content of the process to be remotely supported. For example, remote support requests may include three categories: driving support request, passenger support request, and operation management support request.

A driving support request is a remote support request related to the safety of driving of the vehicle 10. A driving support request is a support request that occurs in conjunction with operation of the vehicle 10 and requests operation and support by a remote operator as the driver of the vehicle 10. Driving support requests include, for example, remote control of the vehicle (acceleration, deceleration, or steering), setting upper/lower speed limits, authorization to make a right (or left) turn across oncoming traffic, and the like.

A passenger support request is a remote support request related to the safety of passengers in the vehicle 10. A passenger support request is a support request that occurs as passengers board and alight from the vehicle 10 and requests operation and support by a remote operator as the conductor of the vehicle 10. Passenger support requests include a safety check when doors are opened and closed, a passenger safety check, onboard announcements, and the like.

An operation management support request is a remote support request related to the continuity of operations of the vehicle 10. An operation management support request is a request for operation and support by a remote operator as the operation manager of the vehicle 10. Operation management support includes managing the driving plan for the vehicle 10, arranging for a substitute vehicle in the event of a breakdown or being out of fuel, determining to continue or stop driving due to the weather, and the like. However, remote support requests may include categories other than the above-described three categories.

(Configuration of Server)

Figure 3:
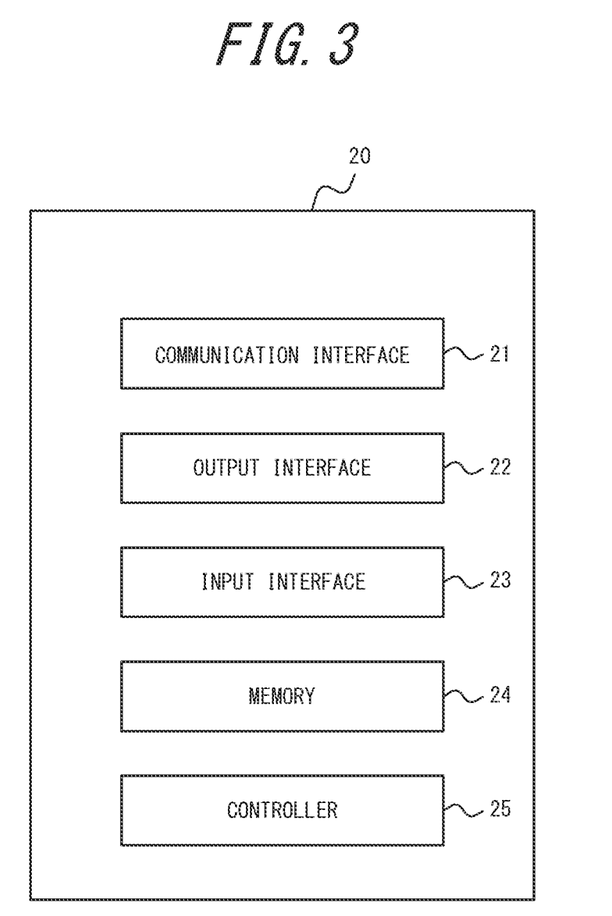
FIG. 3 is a block diagram illustrating a schematic configuration of a server.

Next, with reference to FIG. 3, configurations of the server 20, which is a remote control support apparatus, will be explained in detail. FIG. 3 is a block diagram illustrating a schematic configuration of the server 20.

As illustrated in FIG. 3, the server 20 includes a communication interface 21, an output interface 22, an input interface 23, a memory 24, and a controller 25. The communication interface 21, the output interface 22, the input interface 23, the memory 24, and the controller 25 are communicably connected to each other in a wired or wireless manner.

The communication interface 21 includes a communication module for connecting to the network 40. The communication module is, for example, a communication module compliant with a mobile communication standard such as the 4th Generation (4G) standard or the 5th Generation (5G) standard. The communication module may be, for example, a communication module compliant with a standard such as a wired Local Area Network (LAN) standard or a wireless LAN standard. The communication module may be a communication module compliant with a short-range wireless communication standard such as Wi-Fi, Bluetooth, or an infrared communication standard. In the present embodiment, the server 20 is connected to the network 40 via the communication interface 21. This enables the server 20 to communicate with the vehicle 10, the terminal apparatus 30, and the like.

The output interface 22 includes at least one output apparatus. The output apparatus included in the output interface 22 is, for example, a display, a speaker, a lamp, or the like. The output interface 22 outputs images, sound, light, or the like.

The input interface 23 includes an input apparatus. The input apparatus included in the input interface 23 may, for example, be a touch panel, a camera, a microphone, or the like. The input interface 23 accepts input operations from a user.

The memory 24 is, for example, a semiconductor memory, a magnetic memory, an optical memory, or the like. The memory 24 may function as, for example, a main memory, an auxiliary memory, or a cache memory. The memory 24 stores any information used for operations of the server 20. For example, the memory 24 stores a system program, an application program, embedded software, or the like. The information stored in the memory 24 may be updated with, for example, information acquired from the network 40 via the communication interface 21.

The controller 25 includes at least one processor. The processor may be, for example, a general purpose processor such as a Central Processing Unit (CPU), a dedicated processor that is dedicated to specific processing, or the like. The controller 25 is not limited to a processor and may include at least one dedicated circuit. Examples of dedicated circuits may include a Field-Programmable Gate Array (FPGA) and an Application Specific Integrated Circuit (ASIC). The controller 25 controls the above-described components such as the communication interface 21, the output interface 22, the input interface 23, and the memory 24 to realize the functions of the server 20, including the functions of these components.

(Operations of Remote Control Support System)

Figure 4:
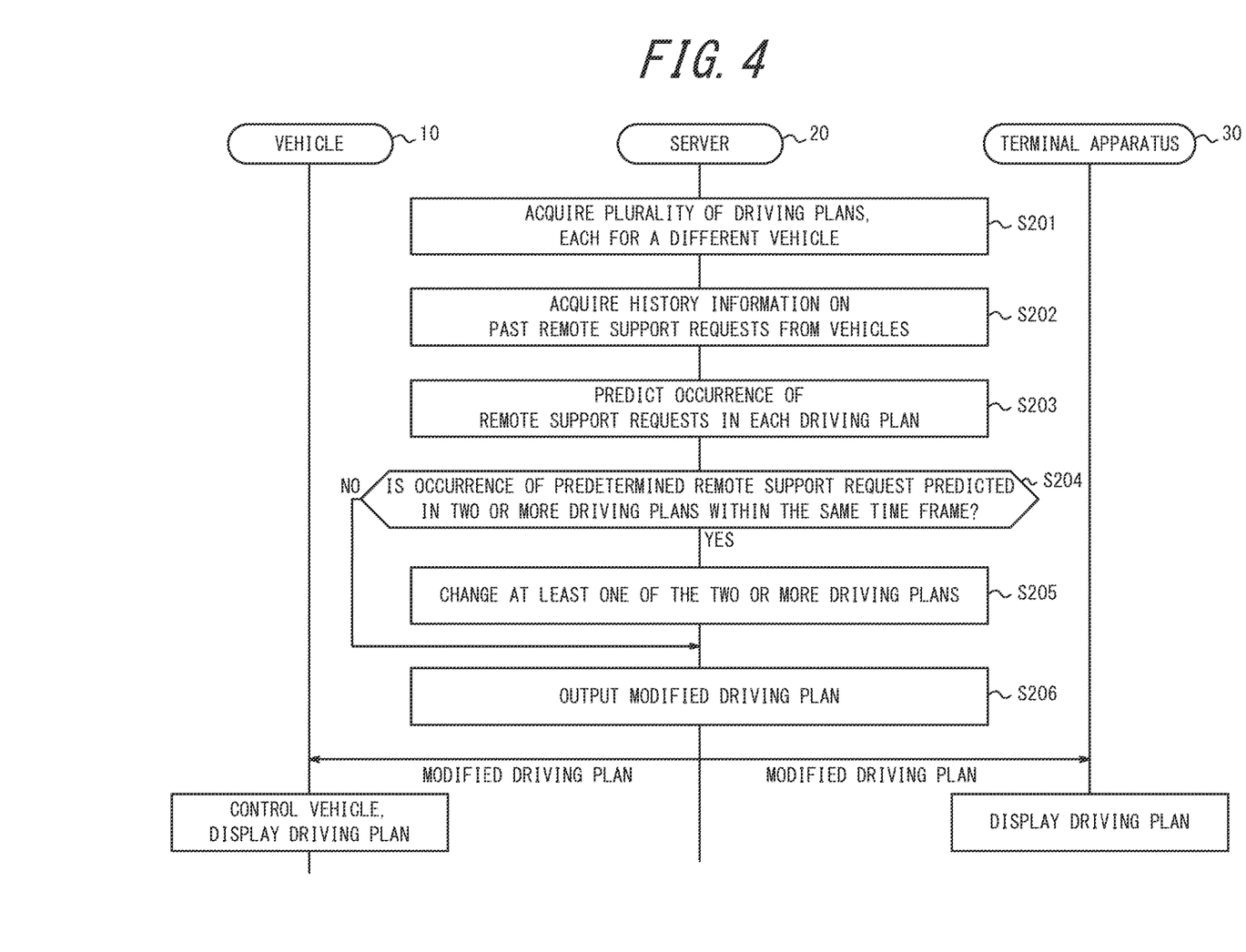
FIG. 4 is a flowchart illustrating second operations of the remote control support system.
Figure 5:
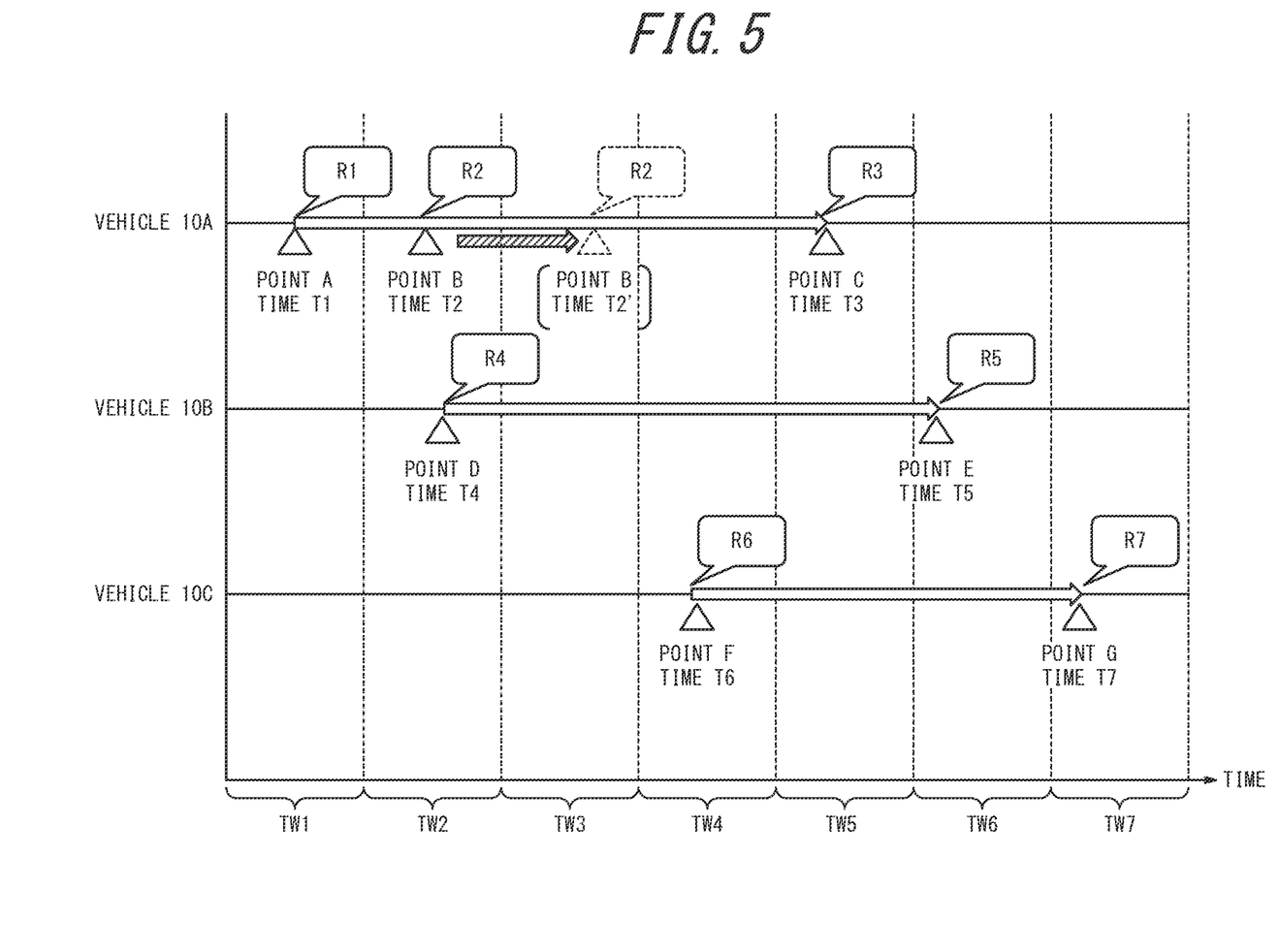
FIG. 5 is a time chart illustrating the driving plans of a plurality of vehicles.

Referring to FIGS. 4 and 5, operations of the remote control support system 1 regarding the management of the driving plans of a plurality of vehicles 10 is described. FIG. 4 is a flowchart illustrating operations of the remote control support system 1. FIG. 5 is a time chart illustrating the driving plans of a plurality of vehicles 10A, 10B, 10C, with the horizontal axis representing the time axis. The flowchart in FIG. 4 illustrates the operations of the vehicle 10, the server 20, and the terminal apparatus 30 included in the remote control support system 1. Therefore, the description of these operations corresponds to a control method for the remote control support system 1, and also corresponds to a control method for each of the vehicle 10, the server 20, and the terminal apparatus 30 included in the remote control support system 1.

In this description of operations, one operator is assumed to operate the terminal apparatus 30 to provide remote control support for the three vehicles 10A, 10B, 10C. However, in the remote control support system 1, the number of vehicles 10 for which one operator provides remote support may be a number other than three. Alternatively, a plurality of operators may work as a team to provide remote control support for a plurality of vehicles 10.

In the present operation example, the three vehicles 10A, 10B, 10C drive according to their respective driving plans. For example, in the example illustrated in FIG. 5, the vehicle 10A is assumed to drive according to a driving plan to depart from point A at time T1, pass through point B at time T2, and arrive at point C at time T3. It is also assumed that the vehicle 10B drives according to a driving plan to depart from point D at time T4 and arrive at point E at time T5. It is assumed that the vehicle 10C drives according to a driving plan to depart from point F at time T6 and arrive at point G at time T7. In the present embodiment, as indicated by the plurality of time frames TW1 to TW7 provided along the time axis in FIG. 5, the remote control support system 1 is assumed manage the driving plans of a plurality of vehicles 10 associated with time frames TW. The length of one time frame TW is, for example, 15 to 30 minutes, though this length is not limiting.

Referring to FIG. 4, in step S201, the controller 25 of the server 20 acquires a plurality of driving plans, each of which is for a different vehicle 10.

Any method can be employed to acquire the driving plans for the plurality of vehicles 10. For example, the controller 25 of the server 20 may receive the driving plans for the plurality of vehicles 10 from another computer via the communication interface 21. For example, the controller 25 may generate driving plans for a plurality of vehicles 10 based on information received from the plurality of vehicles 10, from the terminal apparatus 30, or from another computer via the communication interface 21. Alternatively, the controller 25 may store the driving plans for the plurality of vehicles 10 in the memory 24 in advance. The driving plan for the vehicle 10 is, for example, a time-priority driving plan that reduces the travel time of the vehicle 10 from the departure location to the destination, or a distance-priority driving plan that reduces the travel distance of the vehicle 10 from the departure location to the destination, though these examples are not limiting.

In the example illustrated in FIG. 5, the controller 25 of the server 20 acquires the driving plans for vehicle 10A, vehicle 10B, and vehicle 10C.

Referring again to FIG. 4, in step S202, the controller 25 of the server acquires history information on past remote support requests from the vehicles 10.

The history information on remote support requests is information generated as a result of the receipt of a remote support request from the vehicle and the response by the operator to the received request. In the present embodiment, the history information includes, for example, vehicle information, travel route, time of occurrence (date, time frame, weekday/weekend/holiday), location of occurrence (positional information, travel direction), content of remote support request, classification of remote support request (driving support request, passenger support request, operation management support request), whether occurrence of the remote support request was predicted, whether the operator responded, the response time, and the like. However, the history information may include information other than the above-described information. The history information may include information generated upon receipt of remote support requests from vehicles other than the vehicles 10A, 10B, 10C that are subject to remote control support by the operator.

Any method can be employed to acquire the history information on remote support requests. For example, the controller 25 of the server 20 may receive the history information from another computer via the communication interface 21. For example, the controller 25 may also generate the history information by associating a remote support request received from the vehicle via the communication interface 21 with information acquired and generated in processing that request. Alternatively, the controller 25 may store the history information in the memory 24 in advance.

In step S203, the controller 25 of the server 20 predicts the occurrence of remote support requests in each of the driving plans based on the history information on remote support requests.

Any method can be employed to predict the occurrence of remote support requests in the driving plans. For example, the controller 25 of the server 20 may use a prediction algorithm to identify the occurrence conditions of remote support requests based on the history information on past remote support requests and extract remote support requests such that the driving plan for the vehicle 10 satisfies the occurrence conditions. The occurrence conditions include, for example, the location and time of occurrence of the remote support request. For example, the controller 25 may map the travel route included in the driving plan for the vehicle 10 on a map in which locations where remote support requests may occur are plotted based on the history information and may determine whether locations where remote support requests may occur exist along the travel route. The controller 25 may predict that a remote support request will occur in the driving plan for the vehicle 10 in a case in which a location where a remote support request may occur exists along the travel route. As prediction information on remote support requests, the controller 25 may store information on the location and time of occurrence, content, classification, and the like of the remote support requests predicted to occur in the memory 24 in association with the travel route.

The prediction algorithm may be constructed by a statistical method such as machine learning or deep learning. For example, the prediction algorithm may be tuned by statistical methods based on the prediction of a remote support request and the result of whether a remote support request actually occurs. As history information continues to accumulate, this approach can improve the accuracy of predicting the occurrence of remote support requests. The prediction algorithm may, however, be represented by a predetermined relationship that is not based on statistical methods.

In step S203, the controller 25 of the server 20 may calculate the probability of occurrence of a remote support request as part of predicting the occurrence of a remote support request. For example, for a certain remote support request that may occur in the future, the controller 25 can, based on the history information, the prediction of similar remote support requests in the past, and the results of whether those similar remote support requests in the past actually occurred, calculate the probability of occurrence of the remote support request that may occur in the future. The controller 25 may include the calculated probability of occurrence of the remote support request in the prediction information for the remote support request and store the prediction information in the memory 24.

In step S203, the controller 25 of the server 20 may calculate the estimated response time of a remote support request as part of predicting the occurrence of a remote support request. For example, for a certain remote support request that may occur in the future, the controller 25 can, based on the history information, calculate the response time of the remote support request that may occur in the future from the response time of similar remote support requests in the past. The controller 25 may include the calculated estimated response time of the remote support request in the prediction information for the remote support request and store the prediction information in the memory 24.

In step S204, the controller 25 of the server 20 determines whether the occurrence of a predetermined remote support request is predicted in two or more driving plans within an identical time frame.

For example, the controller 25 of the server 20 may determine whether a predetermined remote support request is predicted to occur in two or more driving plans within the same time frame by mapping a plurality of driving plans to a time chart such as the one illustrated in FIG. 5. For example, in the example illustrated in FIG. 5, assume that the controller 25 predicts that predetermined remote support requests R1 to R7 will occur at respective points A to G included in the three driving plans. In such a case, the controller 25 determines that the occurrence of a predetermined remote support request is predicted in two or more driving plans within the same time frame based on how the occurrence of a predetermined remote support request R2 in the driving plan for the vehicle 10A and the occurrence of a predetermined remote support request R4 in the driving plan for the vehicle 10B are predicted within the time frame TW2.

In the present embodiment, the predetermined remote support request refers to a remote support request that has a high level of importance. The predetermined remote support request is, for example, a remote support request that involves operation by an operator. Consequently, time frames that could increase the burden on operators can be identified in advance, and preventative measures can be taken.

For example, a predetermined remote support request may be in any of the above-described three categories of remote support requests (driving support request, passenger support request, and operation management support request). In some embodiments, the predetermined remote support request may be a driving support request or a passenger support request. As described above, the driving support request is a support request that occurs in conjunction with operation of the vehicle 10 and requests operation and support by a remote operator as the driver of the vehicle 10. The passenger support request is a support request that occurs as passengers board and alight from the vehicle 10 and requests operation and support by a remote operator as the conductor of the vehicle 10. In this way, it is particularly beneficial to identify in advance the time frames in which requests may occur in overlap, since delays and/or errors in operator response to driving support requests and passenger support requests are likely to lead to accidents by the vehicle 10, and since the number of remote support requests that an operator can respond to simultaneously is limited. However, the predetermined remote support request may include a remote support request other than the examples described above.

Referring again to FIG. 4, in step S204, in a case in which the occurrence of a predetermined remote support request is not predicted in two or more driving plans within the same time frame (step S204: No), the controller 25 of the server 20 skips the processing in step S205 and executes the processing from step S206 onward. At this time, the controller 25 may refrain from changing the driving plans for vehicles 10A, 10B, 10C while considering, during subsequent processing, the driving plans to have been changed by the processing in step S205.

On the other hand, in step S204, in a case in which the occurrence of a predetermined remote support request is predicted in two or more driving plans within the same time frame (step S204: Yes), the controller 25 of the server 20 advances to step S205 and changes at least one of the two or more driving plans for the vehicles 10.

Any method can be employed to change the driving plan. For example, the controller 25 of the server 20 may change at least one driving plan among the two or more vehicles 10 to avoid driving to the location of occurrence during the time frame that includes the time of occurrence of the remote support request predicted in step S203. In a case in which the vehicle 10 subject to change is already driving according to the driving plan, the controller 25 may acquire the positional information for the vehicle 10 from the vehicle 10 via the communication interface 21. In such a case, the controller 25 may use the positional information for the vehicle 10 instead of the departure location in the driving plan when changing the driving plan. The controller 25 stores the modified driving plan in the memory 24. By thus changing the driving plan for the vehicle 10 so that the timings of the occurrence of predetermined remote support requests do not overlap, the load on the operator can be distributed, preventing delays in responding to remote support requests from the vehicle 10. Furthermore, by distributing the load on the operator, the number of vehicles 10 that can be remotely supported by one operator can be increased.

In the example illustrated in FIG. 5, the controller 25 of the server 20 changes at least one of the driving plan for the vehicle 10A and the driving plan for the vehicle 10B, which include respective remote support requests R2 and R4 that are predicted to occur within the same time frame TW2. For example, the controller 25 may change the driving plan for the vehicle 10A to reduce the upper limit of the travel speed of the vehicle 10A from point A to point B and delay the arrival time at point B from time T2 to time T2'. This enables the controller 25 to delay the occurrence of the remote support request R2, thereby preventing the two remote support requests R2 and R4 from occurring within the same time frame TW2.

In step S205, the controller 25 of the server 20 may use any method to select at least one driving plan to be changed from among the driving plans of two or more vehicles 10. For example, in a case in which two or more remote support requests are predicted to occur within the same time frame, the controller 25 may target, for change, the driving plan that includes the remote support request for which a prediction was made later. That is, in a case in which the occurrence of a remote support request in the driving plan for a first vehicle 10 is predicted, but the occurrence of a remote support request in the driving plan for a second vehicle 10 has already been predicted in the time frame containing the time of occurrence of the remote support request for the first vehicle 10, the controller 25 may change the driving plan for the first vehicle 10.

For example, in a case in which a driving support request and a passenger support request are predicted to occur within the same time frame, the controller 25 of the server 20 may give priority to changing the driving plan for which the passenger support request is predicted to occur. As described above, a passenger support request is a support request that occurs as passengers board and alight from the vehicle 10, and compared to driving support requests, the time of occurrence can be changed relatively easily by changing the driving plan. For example, in a case in which the vehicle 10 is a bus, the time of occurrence of the passenger support request can be adjusted by extending or reducing the time that the bus stops at a boarding position or alighting position prior to the time at which the passenger support request is predicted to occur. Furthermore, since passenger support requests often occur while the vehicle 10 is stopped or traveling at low speeds as passengers board or alight from the vehicle 10, the risk of accidents resulting from changes to the driving plan is lower than for driving support requests. In this way, by giving priority to changing a driving plan in which the occurrence of a passenger support request is predicted, the reliability of avoiding an overlapping occurrence of remote support requests can be improved by changing the driving plan, without compromising the safety of the driving plan.

For example, in a case in which the occurrence of a predetermined remote support request is predicted in two or more driving plans within the same time frame, the controller 25 of the server 20 may give priority to changing the driving plan for which a remote support request with a high probability of occurrence is predicted to occur. Some remote support requests exhibit patterns of conditions, such as specific intersections, driving directions, or time slot, and have a high probability of occurring if the conditions are satisfied. Since such remote support requests have few uncertainties, the time of occurrence can very reliably be changed as expected by changing the driving plan for the vehicle 10. For example, in a case in which the remote support request is a request for authorization to make a right (or left) turn across oncoming traffic at a particular intersection, the controller 25 can transmit an instruction to the vehicle 10 to adjust the vehicle speed prior to arrival at the intersection in order to adjust the time of arrival at the particular intersection. In this way, by giving priority to changing a driving plan in which the occurrence of a remote support request with a high probability of occurrence is predicted, the reliability of avoiding an overlapping occurrence of remote support requests can be improved by changing the driving plan.

For example, in a case in which the occurrence of a predetermined remote support request is predicted in two or more driving plans within the same time frame, the controller 25 of the server 20 may give priority to changing the driving plan for which a remote support request with a long estimated response time is predicted to occur. Even when a plurality of remote support requests overlap within the same time frame, processing by the operator is less likely to be delayed if the expected response time is short. For example, in a case in which the remote support request is a request for safety confirmation when opening and closing doors, the operator can process the remote support request in a relatively short time. On the other hand, in a case in which the remote support request is a request for a determination of whether to continue operation in heavy rain, the operator must take into account the upcoming weather forecast and the like to make a determination, which may take a relatively long time. By giving priority to changing the driving plan for which a remote support request with a long estimated response time is predicted to occur, remote support requests are less likely to overlap within a single time frame. Furthermore, even if the overlap of some remote support requests cannot be eliminated by changing the driving plans, and a plurality of remote support requests remain within a single time frame, the shorter estimated response times will reduce the likelihood of the remote support requests overlapping. Consequently, the response by the operator to the remote support request from the vehicle 10 is less likely to be delayed.

In step S206, the controller 25 of the server 20 outputs the modified driving plan.

Any method can be employed to output the modified driving plan. For example, the controller 25 of the server 20 may output the actual driving plan via the output interface 22, such as a display, or may transmit the driving plan to the vehicle 10, the terminal apparatus 30, or the like via the communication interface 21. The modified driving plan can then be used by the vehicle 10 or terminal apparatus 30 for operations such as controlling the vehicle 10 in autonomous driving or the like or displaying the travel route on the display.

The above-described operations from step S201 to step S206 may be performed before the vehicle 10 drives according to the driving plan or may be performed while the vehicle 10 is driving according to the driving plan. The above-described operations may be repeated before or during driving of the vehicle 10. This enables use of the latest positional information for the vehicle 10, the latest road conditions, or the like and improves the reliability of avoiding an overlapping occurrence of remote support requests by changing the driving plan.

As described above, the server 20, which is a remote control support apparatus, according to the present embodiment acquires a plurality of driving plans, each of which is for a different vehicle 10. The server 20 acquires history information on past remote support requests from the vehicles 10 and predicts the occurrence of remote support requests in each of the driving plans based on the history information. In a case in which the occurrence of a predetermined remote support request is predicted in two or more driving plans within an identical time frame, the server 20 changes at least one of the two or more driving plans.

According to such a configuration, in a case in which remote support requests from a plurality of vehicles 10 may occur in overlap based on the history information on past remote support requests, the driving plans of the plurality of vehicles 10 can thus be changed so that the timings of the occurrence of the remote support requests do not overlap. Therefore, the usefulness of technology to remotely support the control of autonomous vehicles can be improved in that the occurrence of remote support requests can be distributed, preventing a delay in response by the operator to the remote support requests from the vehicles 10.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which a general purpose computer functions as the server 20 according to the above embodiment can also be implemented. Specifically, a program in which processes for realizing the functions of the server 20 according to the above embodiment are written may be stored in a memory of a general purpose computer, and the program may be read and executed by a processor. Accordingly, the present disclosure can also be implemented as a program executable by a processor, or a non-transitory computer readable medium storing the program. Examples of the non-transitory computer readable medium include a magnetic storage device, an optical disc, a magneto-optical storage device, and a semiconductor memory.

The invention claimed is:

1. A remote control support apparatus for autonomous vehicles, the remote control support apparatus comprising a controller configured to: acquire a plurality of driving plans, each driving plan being for a different autonomous vehicle; acquire history information on past remote support requests from autonomous vehicles; predict an occurrence of a remote support request in each driving plan in the plurality of driving plans based on the history information, a predetermined remote support request includes a driving support request related to safety of driving of the autonomous vehicle and a passenger support request related to safety of a passenger of the autonomous vehicle; in a case in which the driving support request and the passenger support request are predicted to occur within an identical time frame, give priority to changing the driving plan for which the passenger support request is predicted to occur; in a case in which the occurrence of the predetermined remote support request is predicted in two or more driving plans within an identical time frame, change at least one of the two or more driving plans; and in response to the change of the at least one of the two or more driving plans, the autonomous vehicle is autonomously controlled with the remote support according to the at least one of the two or more driving plans.

2. The remote control support apparatus according to claim 1, wherein the predetermined remote support request is a remote support request that requests operation by an operator.

3. The remote control support apparatus according to claim 1, wherein
predicting the occurrence of the remote support request includes calculating a probability of occurrence of the remote support request, and
in a case in which the occurrence of a predetermined remote support request is predicted in two or more driving plans within an identical time frame, the controller is configured to give priority to changing the driving plan for which a remote support request with a probability of occurrence based upon a percentage threshold that a pattern of conditions is predicted to occur.

4. The remote control support apparatus according to claim 1, wherein
predicting the occurrence of the remote support request includes calculating an estimated response time for the remote support request, and
in a case in which the occurrence of a predetermined remote support request is predicted in two or more driving plans within an identical time frame, the controller is configured to give priority to changing the driving plan for which a remote support request with a long estimated response time is predicted to occur.

* * * * *